(12) United States Patent
Neal

(10) Patent No.: US 8,523,752 B2
(45) Date of Patent: Sep. 3, 2013

(54) BENTONITE CLAY MIXTURE FOR DISPOSING OF PHARMACEUTICALS

(76) Inventor: Justin Kory Neal, Liverpool, NY (US)

(*) Notice: Subject to any disclaimer, the term of this patent is extended or adjusted under 35 U.S.C. 154(b) by 716 days.

(21) Appl. No.: 12/321,221

(22) Filed: Jan. 20, 2009

(65) Prior Publication Data
US 2011/0144409 A1   Jun. 16, 2011

(51) Int. Cl.
*B09B 5/00* (2006.01)
(52) U.S. Cl.
USPC ........................................... 588/249.5
(58) Field of Classification Search
USPC .................. 588/252, 248.5, 242, 249.5
See application file for complete search history.

(56) References Cited

U.S. PATENT DOCUMENTS

| 4,149,968 | A |   | 4/1979  | Kupiec |
|-----------|---|---|---------|--------|
| 5,372,729 | A | * | 12/1994 | Hooykaas ..................... 588/252 |
| 5,502,267 | A |   | 3/1996  | Aubert |
| 5,915,879 | A |   | 6/1999  | Burnett |

OTHER PUBLICATIONS http://www.fws.gov/southeast/news/2007/r07-050.html.*

* cited by examiner

*Primary Examiner* — John Kreck
(74) *Attorney, Agent, or Firm* — Stephen D. LeBarron

(57) ABSTRACT

Disposal of medications presents a multifaceted problem where medications disposed of via sewage systems can eventually affect water supplies. Meanwhile disposal via normal solid waste systems faces a similar problem and have the added dilemma of potential diversion of drugs of abuse. Combining those medications with an absorbent mixture containing bentonite clay with other absorptive materials allows those medications to be disposed of in a form that limits exposure to a water supply while simultaneously hedging diversion.

8 Claims, No Drawings

BENTONITE CLAY MIXTURE FOR DISPOSING OF PHARMACEUTICALS

CROSS-REFERENCE TO RELATED APPLICATIONS

Not Applicable

FEDERALLY SPONSORED RESEARCH

Not Applicable

SEQUENCE LISTING OR PROGRAM

Not Applicable

BACKGROUND OF THE INVENTION

1. Field

This method generally relates to a means for the disposal of household pharmaceutical compounds, specifically to consumer means of disposing of medicinal and like compounds.

2. Prior Art

Previously, the field of disposal of medications has been an area of pharmacy that has been overlooked. Pharmaceutical use has sky rocketed in the past several decades. There has been growing concern over the disposal of unused medications. Past means of disposal were found to be inadequate in a world where concerns of pollution and environmental impact are on the forefront. Original means included simply flushing the medications down the drain. The concern with simply flushing pharmaceuticals being that pharmaceuticals would proceed through sewage systems, into treatment plants, and then re-enter the water supply further down the line. In recent years, it has been found that this was a potential detriment to persons consuming water supplied from contaminated sources. This is because current means of water treatment largely cannot remove all of these chemicals from the water supply. Potential therapeutic doses of medications could be found in these waterways.

Recent drug control policy has also created a second conundrum for disposal methods of pharmaceuticals. With the growth of drug abuse of prescription medications, a safe means for disposal of controlled medications with abuse potential in such a way as to limit the potential for diversion is of growing importance. Traditionally, the means to prevent that diversion was to dispose of it via sewage systems. Obviously this is not the preferred means for the reasons listed above.

Traditionally, means for disposing of organic and inorganic pollutants involved large disposal sequestering. For example, in U.S. Pat. No. 5,502,267 to Aubert, Mar. 26, 1996, has the limitation of being for larger means of disposal and requiring the final product to be sequestered in a well-like subterranean formation. Obviously, disposal of consumer means of any chemical would most likely not be of this severe of pollutant potential, as outlined in that patent. Being said, the method of disposing of these objects into the ground, are a limiting factor. Similarly, U.S. Pat. No. 4,149,968 to Kupiec, Apr. 17, 1979, disposes of the pollutant by mixing it with bentonite and cement. Again the feasibility of the average person to mix cement as a means of the disposal method are not feasible, considering scale. Both methods described in Aubert and Kupiec are fitting solutions to industrial waste, however, they do not solve the problem of addressing domestic medicinal wastes found in the home.

Similar materials are used in U.S. Pat. No. 5,915,879 to Burnett, Jun. 29, 1999, in the form of creating a sandbag. The slurry in this application has the purpose of inhibiting the flow of water and entails the use of multiple materials and a very in depth production process to accomplish this. This patent, again, operates on a large scale and in this case is meant to simply block the flow of river water in a flood situation.

SUMMARY

In accordance with one embodiment a mixture of clay and fibrous materials such as sawdust combined in a sealing plastic bag where crushed medications, emptied capsules, liquid medications, etc. are placed with the mixture and combined with water to congeal into a solid or a semisolid. That congealed substance is then sealed in the plastic bag and are then disposed in via conventional trash disposal.

DRAWINGS

Not Applicable

DETAILED DESCRIPTION

First Embodiment

One embodiment of the method involves the use of bentonite clay. Bentonite is absorbent silicate clay formed from volcanic ash. It exhibits strong colloidal properties and will swell when introduced to water. This makes it a very valuable material for suspending solids within its matrix. This material is well complimented when combined with sawdust. Sawdust, the familiar by product of woodworking seems more adept at absorbing oil-based chemicals compared to bentonite. The combination of the two appears to provide a good balance of absorbing both water based and oil based medications.

This embodiment involves combining powdered bentonite with sawdust in a ratio ranging from 1:1 to 3:1 by volume (Bentonite:Sawdust). This mixture can be mixed by any appropriate means by either a simple mixer or, in small enough quantities, by stirring together with a small hand mixing device. This combination is then placed in a plastic bag. The bag preferably has an adhesive seal at the open end of the bag that, upon completion of the method, can simply be sealed by activating the adhesive seal and closing the bag. The size of the bag shall be of adequate size to fit the volume of clay and sawdust mixture and subsequent pharmaceuticals and liquid.

The medications are added to the bag containing the bentonite-sawdust mixture. The medications would include crushed tablets, opened capsule powder, and poured liquids, etc. These materials are placed into the bag on top of the bentonite-sawdust mixture. The bentonite-sawdust mixture can ideally accommodate a volume of medications approximately equal to the volume of bentonite-sawdust itself. The combination of bentonite, sawdust, and medications is then hydrated with water. The volume of water should be in approximate ½ to 2 parts water to 1 part of bentonite, sawdust, and medication mixture.

The combination in the bag should then be sealed by activating the adhesive on the bag. The bag, once sealed, should have pressure applied to it by the operators' hand, squeezing the contents of the bag to help ensure a uniform dispersion of liquid within the bag. The materials within should become a consistency ranging from a thick slurry to a tacky clay material. This has absorbed the medication and suspended it within the mixture. The bag and its contents can then be disposed of by conventional solid waste removal.

The medications, suspended within the bentonite-sawdust mixture within the bag, are less likely to leach into water sources. The suspended medications within the mixture as well limit any potential diversion of the medications due to its incorporation into the bentonite and saw dust.

Alternate Embodiment

An alternate embodiment of this method entails a potential alternate to the use of sawdust that could include the use of other absorbent materials. Other alternate absorbent materials include things such as sand, alternate forms of clay including but not limited to fuller's earth, or even synthetic silicate in a form similar to desiccants. These materials would be used in similar ratios as saw dust would be used above. The factor of these or any other possible alternate embodiment is a material that will compliment the bentonite clay by providing a better effect on the absorption of non-water based materials than bentonite.

Conclusions, Ramifications, and Scope

Accordingly the reader will see, that according to one embodiment of the method of disposing of consumer pharmaceutical waste, I have provided that the method is a superior form of disposing of medications in a way that limits its environmental impact by eliminating the need to dispose of medications by sewage systems. Simultaneously the method limits the potential for drug diversion by putting medications in a form that make it more difficult to extract.

While the above description contains many specificities, these should not be construed as limitations on the scope of any embodiment, but as exemplifications of the presently preferred embodiments thereof. Many other ramifications and variations are possible within the teachings of the various embodiments. For example, stirring the medications into the water before pouring the solution into the bentonite-sawdust mixture would be an inconsequential variation. The material that the bag containing the mixture is made of is another example.

Thus the scope of this embodiment should be determined by the appended claims and their legal equivalents, and not by the examples given.

I claim:

1. A method for disposing of pharmaceutical waste, comprising:
   a. converting the pharmaceutical compound to a powder or liquid,
   b. combining said powder or liquid into a mixture of powdered bentonite clay and sawdust inside a sealable receptacle in a ratio of one to three parts powdered bentonite clay to one part sawdust,
   c. combining said ratio of powder or liquid pharmaceutical and said powdered bentonite clay and sawdust mixture with a volume of liquid to form a thick slurry,
   d. mixing said slurry to approximately equal dispersion, and
   e. enclosing said slurry into said sealable receptacle.

2. The method in claim 1 wherein said conversion is performed by reducing particle size by either pulverizing of said compound or emptying of a capsule.

3. The method in claim 1 wherein said volume of liquid is approximately equal in volume to one half to two times the volume of said combination of powder or liquid pharmaceutical compound and sawdust and powdered bentonite mixture.

4. The method in claim 3 wherein said liquid is water.

5. The method in claim 1 wherein the mixing is performed by manipulation of said slurry by squeezing said receptacle by hand.

6. The method in claim 1 wherein said receptacle is a bag.

7. The method in claim 6 wherein the bag has a means by which it may be sealed.

8. The method in claim 7 wherein the seal is a flap of the bag over the open portion of the bag and adhering onto itself by way of an adhesive.

\* \* \* \* \*